United States Patent [19]
Priatko et al.

[11] Patent Number: 5,166,822
[45] Date of Patent: Nov. 24, 1992

[54] LIGHT BEAM FREQUENCY COMB GENERATOR

[75] Inventors: Gordon J. Priatko, Cupertino; Jeffrey A. Kaskey, Livermore, both of Calif.

[73] Assignee: The United States of America as represented by the United States Department of Energy, Washington, D.C.

[21] Appl. No.: 704,256

[22] Filed: May 22, 1991

[51] Int. Cl.$^5$ .............................. G02F 1/11; G02F 1/33
[52] U.S. Cl. .................................... 359/287; 359/306; 359/307
[58] Field of Search .............. 359/285, 287, 305, 306, 359/307, 124, 123

[56] References Cited

U.S. PATENT DOCUMENTS

| | | | |
|---|---|---|---|
| 4,000,939 | 1/1977 | McNaney | 359/307 |
| 4,443,066 | 4/1984 | Freyre | 359/307 |
| 4,456,338 | 6/1984 | Gelbart | 359/287 |
| 4,586,184 | 4/1986 | Hess | 359/287 |
| 4,697,888 | 10/1987 | Schmadel, Jr. et al. | 359/307 |

Primary Examiner—Eugene R. LaRoche
Assistant Examiner—Evelyn A. Lester
Attorney, Agent, or Firm—Miguel A. Valdes; Roger S. Gaither; William R. Moser

[57] ABSTRACT

A light beam frequency comb generator uses an acousto-optic modulator to generate a plurality of light beams with frequencies which are uniformly separated and possess common noise and drift characteristics. A well collimated monochromatic input light beam is passed through this modulator to produce a set of both frequency shifted and unshifted optical beams. An optical system directs one or more frequency shifted beams along a path which is parallel to the path of the input light beam such that the frequency shifted beams are made incident on the modulator proximate to but separated from the point of incidence of the input light beam. After the beam is thus returned to and passed through the modulator repeatedly, a plurality of mutually parallel beams are generated which are frequency-shifted different numbers of times and possess common noise and drift characteristics.

4 Claims, 2 Drawing Sheets

LIGHT BEAM FREQUENCY COMB GENERATOR

BACKGROUND OF THE INVENTION

This invention was made in the course of or under prime Contract No. W-7405-ENG-48 between the U.S. Department of Energy and the University of California. The United States Government has rights in this invention pursuant thereto.

This invention relates to a light beam frequency comb generator and, more particularly, to a device which uses an acousto-optic modulator to generate a plurality of light beams with uniformly separated frequencies, and common noise and drift characteristics.

The goal of optical communications is to exploit the extremely large bandwidth of the optical portion of the electromagnetic spectrum in ways analogous to traditional electrical communications. According to an optical communication system disclosed in U.S. Pat. No. 4,791,630 issued Dec. 13, 1988 and assigned to the present assignee, laser optical communications are carried out by producing laser beams of different frequencies, splitting one or more of these constituent beams into reference and signal beams, encoding information on the signal beams by frequency modulation and detecting the encoded information by heterodyne techniques. One method of producing such laser beams would be to provide a plurality of laser sources with different frequencies. A simpler, more economically advantageous mechanism for producing such beams is desired.

SUMMARY OF THE INVENTION

It is therefore an object of the present invention to provide a plurality of light beams which, being derived from a single coherent source, differ in frequency by fixed integer multiples of a separation frequency $F_m$, and possess common noise and drift characteristics. By making the noise and drift of the light beams a common mode characteristic, these anomalies are easier to reject in the system.

It is another object of the present invention to provide a device for generating such multi-frequency beams which is applicable to optical communications.

According to one embodiment of the present invention with which the above and other objects can be achieved, acollimated monochromatic input light beam is passed through an acousto-optic modulator which serves to shift the frequency of the incident light beam by a fixed amount. For the purpose of our discussion, we shall consider an acousto-optical modulator (hereinafter referred to as the modulator) operating at a fixed frequency $F_m$ as a device which accepts an optical input A and produces a group of optical outputs $Y_i$ ($i=0, 1, \ldots, n$). If the optical input to the modulator is of frequency $F_0$, the outputs $Y_i$ will be of frequencies $F_0 + iF_m$. The angle of incidence between the input light beam A and the modulator is arranged so as to insure that the major portion of the input light beam is delivered into one of the output light beams. The angle of incidence between the input light beam and the modulator can be set so as to produce a frequency shift of either $+iF_m$ or $-iF_m$ in the output beams. For the purpose of this example, we have defined the output light beam $Y_1$ to be the only member of the set of output light beams (resulting from the input light beam A) which we intend to preserve. We shall hereinafter refer to the output light beam $Y_1$ as the preserved output light beam.

In one embodiment of the present invention, the output beams $Y_0, Y_2, \ldots, Y_n$ are blocked but the preserved beam $Y_1$ is directed by an optical system along a path which is parallel to but separated from the path followed by the first input light beam and is made incident on the modulator at a point which is proximate to the point of incidence of the first input light beam. In this way, the output $Y_1$ becomes another input $A'$ which generates another set of outputs $Y'_0, Y'_1, \ldots, Y'_n$. The optical system then selects output $Y'_1$ and delivers it to the input of the modulator where it serves as still another input $A''$ which in turn generates outputs $Y''_0, Y''_1, \ldots, Y''_n$. Each time when an input light beam passes through the modulator, both its frequency upon exit and its position of re-incidence are shifted. Thus, a comb-like group of beams with frequencies shifted different numbers of times is generated and can be taken out by means of a beam splitter placed in the path of the selected beams. Each beam contains noise and drift characteristics as represented in the input light beam, thus facilitating rejection of these undesirable common mode features during output detection.

Additional objects, advantages and novel features of the present invention will be set forth in part in the description which follows, and in part will become apparent to those skilled in the art upon examination of the following, or may be learned by practice of the invention. The objects, features and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
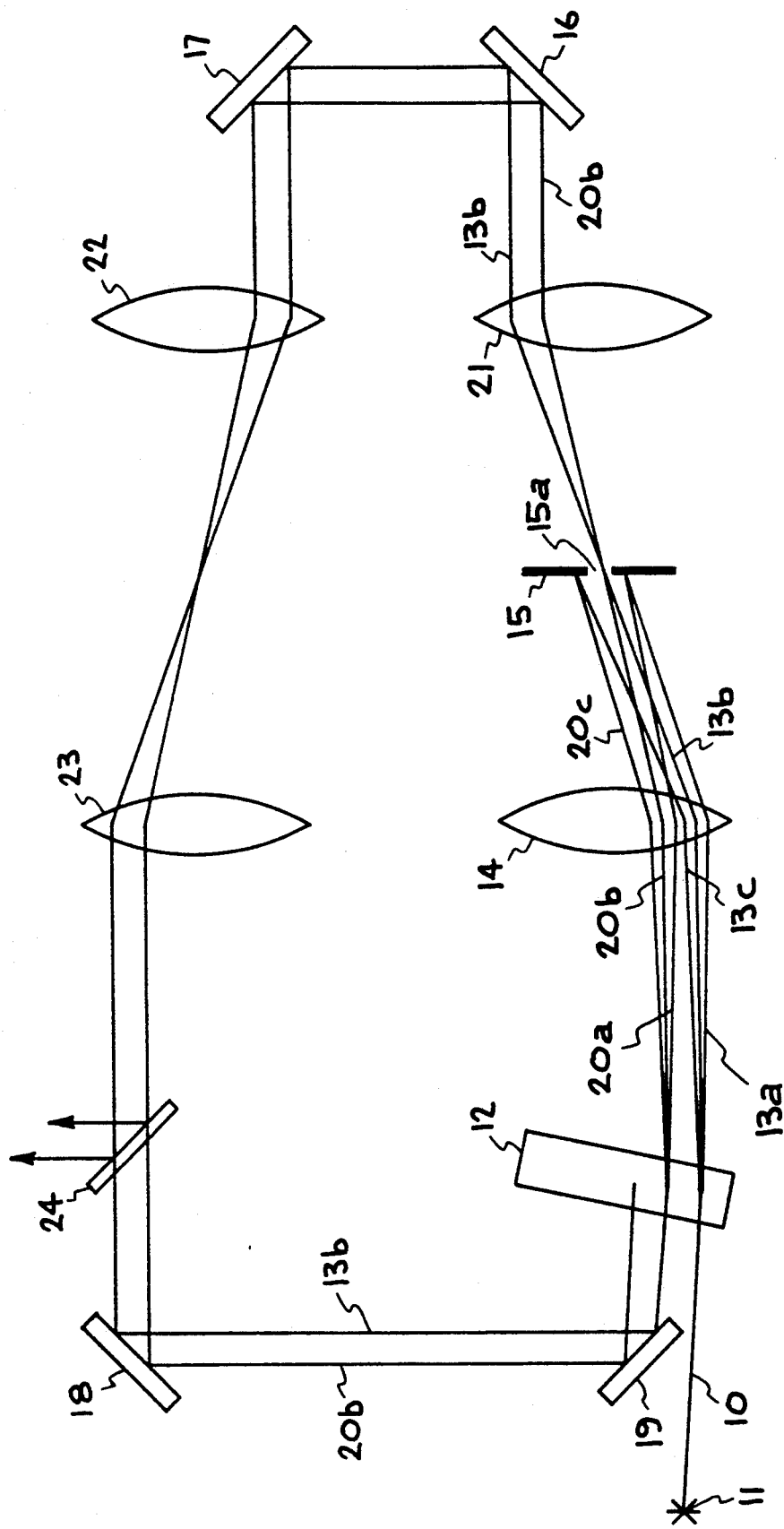
FIG. 1 is a schematic drawing diagrammatically showing the principle of a light beam frequency comb generator embodying the present invention.

Broadly described, a light beam frequency comb generator embodying the present invention shown in FIG. 1 is comprised of a light source 11, an acousto-optic modulator 12 and an optical system including converging lenses 14, 21, 22 and 23 and reflective mirrors 16, 17, 18 and 19. The light source 11 is characterized as providing a well-collimated monochromatic light beam 10 (of frequency hereinafter denoted by $F_0$) such as a laser beam, which is passed through the acousto-optic modulator 12 which serves to change the frequency of a part of the incoming light, another part of the incoming light passing therethrough unmodulated in frequency. For the purpose of our discussion, we shall consider the acousto-optic modulator 12 operating at a fixed frequency $F_m$, as a device which accepts an optical input 10 and transforms it into a set of output light beams 13a, 13b and 13c. In principle, the modulator 12 will transform the input light beam 10 into more than three output light beams. In practice, these other output light beams are very weak and can therefore be neglected.

When the input light beam 10, which is of frequency $F_0$, is made incident upon the modulator 12, which is operating at a fixed frequency $F_m$, the resultant output light beam 13a is of frequency $F_0$, the output light beam 13b is of frequency $F_0+F_m$, and the output light beam 13c is of frequency $F_0+2F_m$. The angle of incidence between the input light beam 10 and the modulator 12 is arranged so as to insure that the maximum possible fraction of the input light beam 10 is delivered into the output light beam 13b. The orientation of the modulator 12 can be selected with respect to the input light beam 10 such that a frequency shift of either $+F_m$ or $-F_m$ can be obtained with favorable energy efficiency.

The first of the converging lenses (indicated by numeral 14) is disposed behind the modulator 12, that is, on the opposite side of the modulator 12 with respect to the light source 11. An opaque screen 15 with an aperture 15a is disposed further behind the lens 14 with respect to the modulator 12 such that the light beam 13b is allowed to pass through this aperture 15a but the light beams 13a and 13c are blocked by the screen 15 so as to be either absorbed or deflected thereby. The second of the converging lenses (indicated by numeral 21) is disposed between the screen 15 and the first mirror 16 and acts in concert with the first lens 14 such that parallel light beams normally incident on the lens 14 emerge from the lens 21 as parallel light beams.

The once-modulated beam 13b, after passing through the aperture 15a, is deflected by approximately 90° in the horizontal plane by each of the four mirrors 16, 17, 18 and 19 such that upon reflection from the mirror 19, the once-modulated beam 13b is along a line path which is parallel to the path of the input light beam 10 but slightly aside therefrom, and is made incident at a point on the modulator 12 which is proximate to the point of incidence of the input light beam 10. The last of the four mirrors (indicated by numeral 19) has one of its edges located extremely close to the path of the input light beam 10 and the optical system comprised of these mirrors 16, 17, 18 and 19 and the lenses 14, 21, 22 and 23 is designed such that the aforementioned once-modulated beam 13b is made incident at a point proximate to this edge of the fourth mirror 19.

After the once-modulated beam 13b is thus made incident onto the modulator 12, the modulator 12 transforms the light beam 13b into a set of output light beams 20a, 20b and 20c. The light beam 13b is directly analogous to the light beam 10 and the output light beams 20a, 20b and 20c are directly analogous to the output light beams 13a, 13b and 13c. The converging lens 14 behind the modulator 12 causes the light beams 20a and 20c to be blocked by the screen 15. The twice-modulated beam 20b emerges from the modulator 12 along a path which is parallel to the path followed by the once-modulated beam 13b. The converging lens 14 is adapted such that parallel light beams incident upon it are focused at the position of the aperture 15a in the screen 15.

The twice-modulated beam 20b which is of frequency $F_0+2F_m$ is deflected four times by the mirrors 16, 17, 18 and 19 such that upon reflection from the mirror 19, the twice-modulated beam 20b is following a path which is parallel to the path followed by the input light beam 10 and made incident on the modulator 12 at a point which is proximate to the point of incidence of the once-modulated beam 13b. The set of lenses 22 and 23 is inserted between the second mirror 17 and the third mirror 18 in the path of the modulated beams such that the twice-modulated beam 20b, when making incidence onto the modulator 12, will be on the distal side of the once-modulated beam 13b relative to the input light beam 10.

For the sake of clarity, the thrice-modulated and further-modulated beams are not shown in FIG. 1. It should be clear from the description above, however, that each time that the input light beam 10 is allowed to pass through the modulator 12 and travel through the aperture 15a in the screen 15, a once more frequently modulated beam is generated on the distal side of the less frequently modulated beams (relative to the input light beam 10). These beams, which have been modulated different numbers of times, are thus spatially separate and can be taken out of this optical system as a comb-like array of beams by means of a beam splitter 24 of any known kind disposed at a convenient place in the path of the modulated beams. In FIG. 1, the beam splitter 24 is shown to be disposed between the fourth converging lens 23 and the third mirror 18. The indicated location of beam splitter 24 is not intended to be a preferred locution or to limit the scope of the invention.

Figure 2:
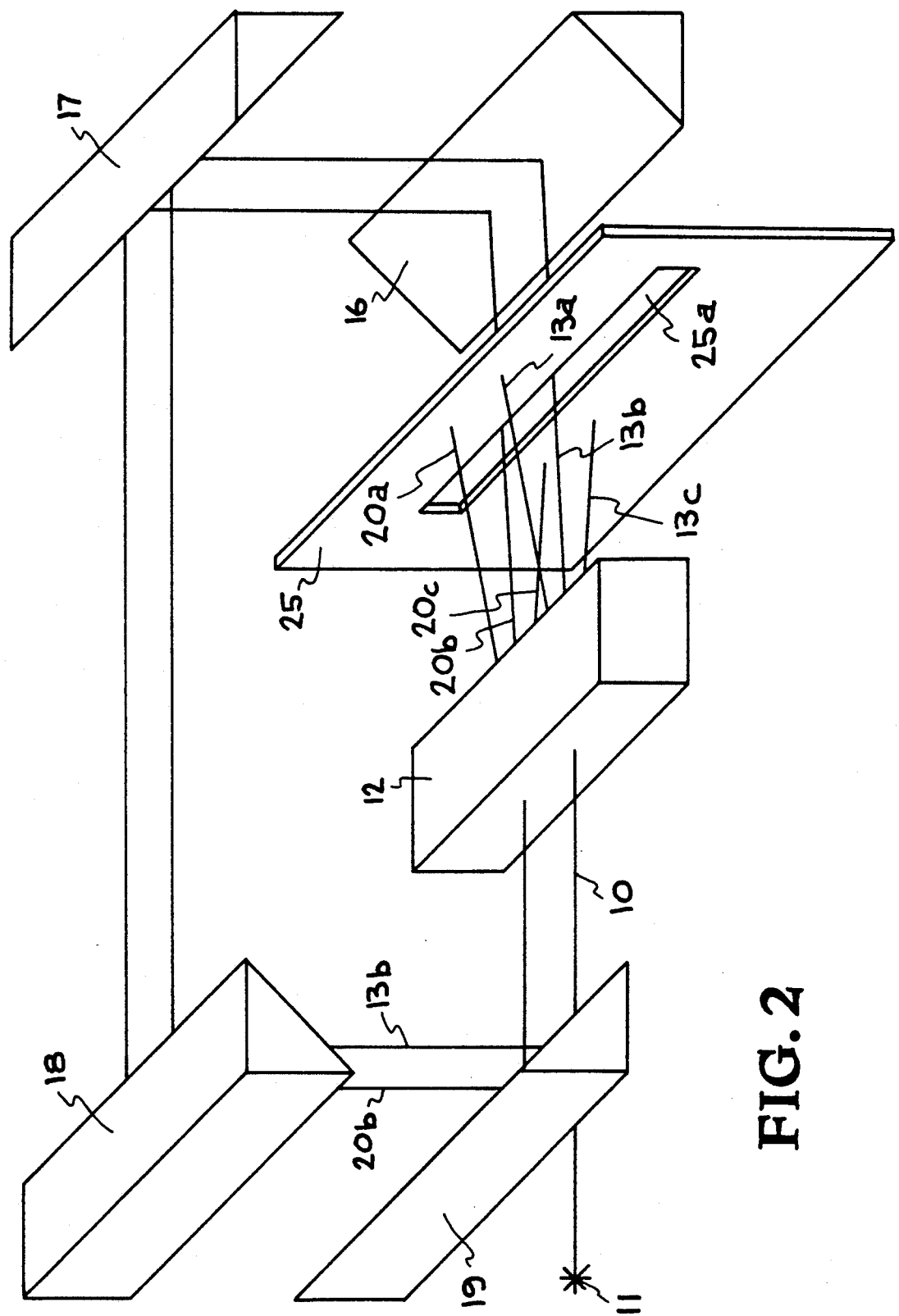
FIG. 2 is a schematic drawing of another light beam frequency comb generator embodying the present invention.

FIG. 2 shows another light beam frequency comb generator embodying the present invention wherein components which are comparable and function similarly to those described above in connection with FIG. 1 are indicated by the same numerals. The embodiment shown in FIG. 2 is different from the embodiment shown in FIG. 1 in that the mirrors 16, 17, 18 and 19 are oriented such that the once-modulated beam 13b is deflected by 90° in the vertical direction. The advantage of arranging the mirrors 16, 17, 18 and 19 as shown in FIG. 2 is that the lenses 14, 21, 22 and 23 of FIG. 1 are eliminated. Moreover, a plate 25 with a horizontal slit may take the place of the apertured screen 15 of FIG. 1.

The foregoing description of preferred embodiments of the invention has been presented for purposes of illustration and description. It is not intended to be exhaustive or to limit the invention to the precise form disclosed, and many modifications and variations are possible in light of the above teaching. For example, the number of frequency-modulated beams that can be taken out is not intended to limit the scope of the invention. Nor is the illustrative use of the optical output light beam $Y_1$ as the preserved light beam intended to limit the scope of the invention. Embodiments of this invention which utilize any of the output light beams $Y_0, Y_1, \ldots, Y_n$ may be constructed. The figures are intended to be only schematical and do not represent preferred dimensional or positional relationships of the various illustrated components. Any such modifications and variations that may be apparent to a person skilled in the art are intended to be included within the scope of this invention.

What is claimed is:

1. A light beam frequency comb generator for outputting a plurality of light beams are mutually separated in frequency and of common noise and drift characteristics, comprising:

an acousto-optical modulator for producing a plurality of sets of optical beams in response to beams incident on said acousto-optical modulator at a plurality of progressively spaced input locations, each set of output beams having one output beam with a frequency unshifted from that of the beam at the input location relative to said set and a second output beam with a frequency shifted from that of said beam at said input location, a light source means for producing a collimated monochromatic light beam and directing said light beam to be incident on said acousto-optical modulator at a first of said progressively spaced input locations, an optical system for directing the frequency shifted output beams of each set of output beams from said acousto-optical modulator along progressively different paths and making each said output beams incident on said acousto-optical modulator at the next of said progressive input locations relative to the that from which said output beam was produced, said progressively different paths being parallel to one another at at least one location along the lengths of said paths, a beam splitter means disposed in said paths at said location wherein said paths are parallel for deflecting a portion of each frequency shifted output beam out of said paths.

2. A light beam frequency comb generator as set forth in claim 1, wherein said optical system includes reflective mirrors each serving to deflect incident light beams by approximately 90°.

3. A light beam frequency comb generator as set forth in claim 1, wherein said optical system includes a screen for blocking said frequency unshifted output beams but allowing said frequency shifted output beams to pass therethrough.

4. A light beam frequency comb generator as set forth in claim 1, wherein said light source means includes an optical laser.

* * * * *